Figure 1:
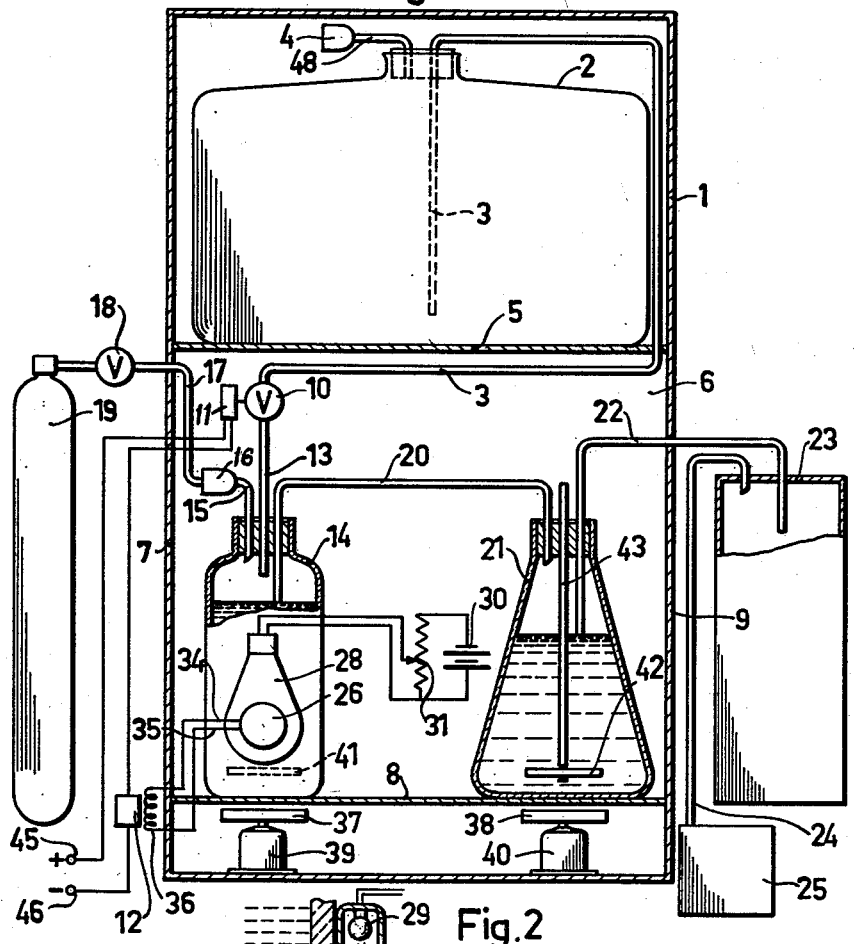

March 9, 1965

K. B. BJÖRKLUND 3,172,235

APPARATUS FOR LIVE CELL PROPAGATION

Filed Nov. 27, 1961

United States Patent Office 3,172,235
Patented Mar. 9, 1965

3,172,235
APPARATUS FOR LIVE CELL PROPAGATION
Knut Bertil Björklund, Appelviksvagen 26,
Bromma, Sweden
Filed Nov. 27, 1961, Ser. No. 155,154
Claims priority, application Sweden, Nov. 26, 1960,
11,450/60
6 Claims. (Cl. 47—1.4)

The object of the present invention is to facilitate a continuous culture of live cells, particularly tissue cells of mammals, for instance, antigens, virus, enzymes and hormones. The cells are confined in a culture flask and are suspended in a culture medium and are allowed to multiply themselves by division. The cultivation of such cells on a larger scale has been a long-felt need in the medical research work, particularly in the field of immunology.

The invention is of particular importance in cancer research. As is well-known, it is considreably more difficult to concentrate a suspension of tissue cells than a suspension of bacteria, because the latter are considerably less sensitive. For this reason, the cultivation of, for instance, mammal cells has hitherto only been possible on a small scale and mostly sporadically.

The object of the present invention is to increase the production of cells without requiring additional human working-power. In achieving this object a quantity of medium containing the selected cells is held in a culture flask while being stirred until its cell concentration has reached a predetermined limit value, whereupon a new quantity of medium entirely or nearly devoid of cells is supplied and a corresponding quantity of the medium rich in cells is withdrawn.

The supply of the additional quantity of medium devoid of cells may result in either (1) the reduction in the rate of increase in cell concentration or (2) the cell concentration is held constant as long as the supply is going on. For the present purpose the last alternative only is of interest. If the supply is so abundant that the cell concentration is reduced, the procedure described above is repeated by interrupting the supply and letting the culture flask remain as it is until its cell concentration again has grown up to the above mentioned limit value. This procedure can be continued for a long time with alternate exchanges of medium and intermediate culture periods without any supply or withdrawal of medium.

If cells are suspended with a low concentration in the constant culture medium and the temperature thereof and other conditions are suitable for cell culture a diagram may be plotted for the variation of the cell concentration as a function of time. It has been found that initially the curve proceeds nearly horizontally but that, after the lapse of a certain time depending upon the kind of cells in question, the nature of culture medium, et cetera, this curve will show a sharp rise up to a maximum value whereupon the cells start to decompose and the cell concentration again falls. To reach the highest possible production of cells, it is thus of importance that the operator keep the cell concentration within the range of the steeply rising part of the curve. The upper limit of the cell concentration should thus be selected comparatively high yet without running the risk that the concentration will reach the neighborhood of the maximum point.

If the exchange of concentrated medium against medium devoid of cells is made quickly the cell concentration is reduced in a measure dependent on the quantity of medium supplied and withdrawn respectively per unit of time. Such a supply should be broken off at the right time so that the concentration of the cells remaining in the culture flask immediately after the exchange is sufficiently high that the cell concentration will again rise quickly in course of time.

Figure 2:
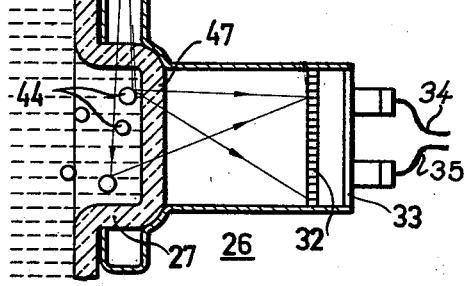

The invention will be more closely described with reference to the accompanying drawing which illustrates an apparatus made accordingly to the present invention. FIGURE 1 is a diagrammatic reproduction of a vertical section through the apparatus. FIGURE 2 is a vertical section at right angle to the section of FIGURE 1.

A box 1 is provided with three compartments the uppermost of which contains a storage tank 2 which contains a supply of culture medium devoid of cells, preferably kept at room temperature. The tank 2 is provided with an air inlet 48, which, via a bacteria filter 4, communicates with the atmosphere. From the lower portion of the tank 2 there extends a suction tube 3, preferably a flexible tubing, extending through the bottom 5 of the compartment down to a lower compartment 6 the walls 5, 7, 8 and 9 of which are heat insulated. This compartment is provided with an electric heating element of conventional deisgn and controlled by a thermostat keeping the temperature of the compartment 6 steadily within a range of +30 to 37° C. In the tube 3 there is included a shut-off valve 10 the position of which is controlled by a solenoid 11. This solenoid is connected to a current source over the terminals 45 and 46 and over a switch 12 which is in turn controlled in a manner which will be explained below. After the valve 10, the suction line continues with a tube 13 having its mouth in the upper part of a culture flask 14. This flask is provided with a gas inlet 15 connected via a bacteria filter 16, a tubing 17 and a valve 18 to a pressure vessel 19, which contains oxygen, nitrogen and carbon dioxide gas in proportions being adapted to the conditions of life of the cells to be cultivated. The culture flask 14 is provided with a suction line 20 having its mouth in a secondary flask 21. From this extends a suction line 22 to a separator 23 in which a negative pressure is maintained via a suction line 24 and an evacuating pump 25, which is assumed to be running all the time. The purpose of the separator is two-fold. Namely, to store and, if desired to centrifugally separate the liquid in order to obtain an increased cell concentration and to serve as a secondary culture flask in producing a virus vaccine.

The culture flask 14 is of a special design. It is preferably made of Pyrex glass and provided with a cup-shaped bulge at 26. In this embodiment the bulge has cylindrical walls 27 with a plane end wall 47 as shown in FIGURE 2. The walls 27 and 47 are transparent and around the walls 27 a box 28 with opaque walls is positioned. This box has an annular window facing the walls 27 along a peripheral zone but is otherwise closed. It is provided with an incandescent lamp 29 which is shown as being supplied from an electric battery 30. The voltage impressed on the lamp is tapped of from a potentiometer 31. On the outside of the end wall 47 there is mounted a photocell 32 which is protected from external light by box 33 having opaque walls. The lines 34, 35 extending from the photocell are connected to a coil 36 adapted to shift the switch 12 when the coil is traversed by a sufficiently strong current. Below the compartment 6 there are two elongated narrow permanent magnets 37 and 38 carried by the shafts of two corresponding electric motors 39 and 40 respectively. Said motors are assumed to rotate continuously. In the flask 14 an elongated narrow permanent magnet 41 is rotatably mounted. The manner of mounting is better understood by reference to the corresponding arrangement in the flask 21 in which the elongated permanent magnet 42 is rotatably mounted at the end of a stainless rod 43 at about the same way as a swivel is rotatably mounted in a fishing tackle.

The apparatus operates as follows. The tank 2 is assumed to contain culture medium wholly or nearly devoid of cells and the culture flask 14 also contains culture medium as well as live cells suspended therein. The later medium should have a temperature of 37° C., and is filled up to a level adjacent the mount of the tube 20 in the flask 14. The valve 18 is open and due to the suction from the pump 25 gas is flowing with a suitable velocity through the tube 17, the filter 16, the tube 15, the flask 14, the tube 20, the flask 21, the tube 22, the vessel 23, and the pipe 24 to the pump 25. In the medium in the flask 14, the live tissue cells have been allowed to multiply and the concentration is assumed to increase along the rising portion of the curve of concentration. Meanwhile, the lamp 29 emits light in a substantially radial direction towards the cells being in the bulge 26. In FIGURE 2 a few such cells are indicated at 44 on an enormously magnified scale. Apparently, some rays of light will be reflected from the surfaces of such cells towards the photocell 32 in a direction being substantially axial to said bulge. When the photocell is excited to such a degree that the current through the coil 36 is able to shift the switch 12 from open to closed position, the solenoid 11 is energized and shifts the valve 10 from closed to open position. Then meduim devoid of cells starts to flow from the tank 2 via the tube 3, the valve 10, and the tube 13, in the form of a fine jet into the flask 14. Due to the kinetic energy of the particles of the jet of medium, the inflowing medium devoid of cells penetrates the liquid resting in the flask 14 and forces its way towards the lower part of the flask. At the same time the corresponding quantity of medium rich in cells will flow through the tube 20 towards the vessel 21.

Due to this exchange of media the cell concentration is reduced in the flask 14. Through the reduction in the number of cells, the flow of reflected light sensed by the photocell 32 is reduced and the electric current supplied to the coil 36 has no more strength enough to hold the switch 12 in closed position, so that this switch is again opened and interrupts the current and thereby causing the solenoid 11 to drop its armature which results in the valve 10 being again closed. Thereupon the quantity of medium in the flask 14 is maintained constant and the cell concentration is increased until a new cycle of the above mentioned type is repeated.

The flask 21 will be grandually filled with cell suspension up to the mouth of the pipe 22 therein. In the apparatus there are two possible ways to set the upper limit for the concentration. The restoring force, such as a spring, biasing the switch 12 to take up its one position, can be adjusted in a conventional way. Further, the luminous intensity of the lamp 29 may be adjusted by means of the potentiometer 31.

The upper limit of the concentration can be set, for instance, by bringing the cell concentration up to a preferred value and then displacing the potentiometer 31 until the switch 12 is only just thrown into circuit. If a larger range of setting is required the tension of the biasing spring of the switch 12 may be adjusted.

The conditions for choking the supply line 3 can then be adjusted so that the cell concentration in the flask 14 is maintained approximately constant all the time the valve 10 then being held open, or said concentration may fall, the valve being then held alternately in open and closed positions.

In the vessel 21 there may be handled and studied such substances as are influenced by the presence of the cells, such as antigens, virus, enzymes and hormones.

Two or more culture flasks may be supplied from the same storage tank 2. Then each flask is equipped with its own valve 10 and its solenoid 11, its switch 12 and its photocell 26. The current supply to the solenoid 11 is then tapped off from a distributor letting through electric operating current intermittently and in due sequence to the terminals 45, 46 of each culture flask. At, for instance, eight culture flasks each terminal pair 45, 46 is connected for 7½ minutes into circuit in each cycle and during this period the corresponding relay devices 10, 11, 12, 36, 26 is given the opportunity to adjust the cell concentration to the preferred value in the corresponding culture flask. Upon being calibrated, the control apparatus may further be used as an analyzer of the growth of cell concentration. Each culture flask 14 may then be individually read-off at arbitrary intervals of time by adjusting the potentiometer 31 into a position in which the switch 12 is just being thrown into circuit. From the standard curve or a scale on the potentiometer 31 for direct calibration the cell density in the culture flask 14 is easily ascertained.

The present invention corresponds thus to the long felt need for a culture apparatus with an all round utility combined with a possibility of a simple procedure for the analysis of the culture process.

What I claim is:

1. A device for continuously cultivating live cells or cell products, particularly of human or animal origin that are adversely affected by light, comprising:
   (a) a culture flask having a cupshaped bulge, said bulge having transparent cylindrical walls and a transparent end wall,
   (b) a supply tank for the storage of a supply of a culture medium wholly or nearly devoid of live cells,
   (c) a supply conduit from said supply tank to said culture flask,
   (d) a valve in said supply conduit to control the flow therethrough,
   (e) a suction conduit leading from said culture flask for removing medium rich in cells,
   (f) a stirring device in said culture flask,
   (g) a control device for said valve including:
      (1) a source of light,
      (2) opaque shielding arranged around said source of light so that the emitted light rays can only pass through the transparent cylindrical walls of said bulge and *only* into the small amount of liquid medium that is contained within said cupshaped buldge,
      (3) a photocell,
      (4) opaque shielding arranged around said photocell so that it can only receive *only* light that has been *reflected* by the liquid medium that is contained within said cupshaped bulge,
      (5) the source of light being mounted exteriorly of said cylindrical wall and said photocell being mounted in axial alignment with said end wall of said cupshaped bulge so that the angle between the reflected light and the source of light is approximately 90 degrees,
      (6) a solenoid for operating said valve in said supply conduit,
      (7) the electrical output of said photocell connected to electrical energizing means for said solenoid, whereby said valve is automatically opened when the cell concentration reaches a predetermined upper limit and is again closed when the cell concentration has fallen to a lower limit,
   (h) said culture flask being entirely shut off from any light source other than the above mentioned source of light associated with the control device.

2. A device for continuously cultivating live cells or cell products, particularly of human or animal origin that are adversely affected by light, comprising:
   (a) a culture flask comprising a major portion that is completely shielded from light and a minor portion that is not shielded from light,
   (b) a supply tank for the storage of a supply of a culture medium wholly or nearly devoid of live cells,
(c) a supply conduit from said supply tank to said culture flask,
(d) a valve in said supply conduit to control the flow therethrough,
(e) a suction conduit leading from said culture flask for removing medium rich in cells,
(f) a stirring device in said culture flask,
(g) a control device for said valve including:
  (1) a source of light,
  (2) a photocell,
  (3) said source of light and said photocell being located exterior of but adjacent to said minor portion of the culture flask and being shielded by opaque means, both with respect to each other and with respect to said minor portion of the culture flask so that the source of light shines upon only a very small portion of the liquid medium within the culture flask and so that said photocell only receives light that has been reflected by said liquid medium,
  (4) a solenoid for operating said valve in said supply conduit,
  (5) the electrical output of said photocell connected to electrical energizing means for said solenoid, whereby said valve is automatically opened when the cell concentration reaches a predetermined upper limit and is again closed when the cell concentration has fallen to a lower limit,
(h) said culture flask being entirely shut off from any light source other than the above mentioned source of light associated with the control.
3. The device of claim 2 wherein at least one of the said culture flasks has a wall portion shaped as a transparent bulge having a transversal transparent end wall, the light source emitting light inwards into the bulge at an angle to the axis of said end wall, and the photocell is mounted in the axis of said end wall.
4. The device of claim 2, where at least one additional culture flask is fed from said storage tank through at least one additional supply conduit and which includes:
  (1) a valve in a each additional supply conduit,
  (2) a control device for each of said culture flasks,
  (3) an electrical energy supply,
  (4) means to sequentially energize the control devices of each of said culture flasks, whereby the cell concentration in each of said culture flasks can be adjusted intermittently.
5. A device according to claim 1 wherein said stirring device consists of a permanent magnet within the flask that is activated by a moving magnet adjacent the flask.
6. A device according to claim 2 wherein said stirring device consists of a permanent magnet within the flask that is caused to rotate by a rotating magnet located adjacent the flask.

References Cited by the Examiner
UNITED STATES PATENTS

| | | | |
|---|---|---|---|
| 2,658,310 | 11/53 | Cook | 47—58 |
| 2,975,553 | 3/61 | Paul | 47—1 |

FOREIGN PATENTS 485,041  10/29  Germany.

OTHER REFERENCES

Culture Conditions and the Development of the Photosynthetic Mechanism, by Myers and Clark, Journal of Gen'l Physiology, vol. 28, Issue 2, Nov. 20, 1944, pages 105–108 are relied on.

ABRAHAM G. STONE, *Primary Examiner.*
A. JOSEPH GOLDBERG, T. GRAHAM CRAVER,
*Examiners.*